(12) United States Patent
Hernando

(10) Patent No.: US 9,163,942 B2
(45) Date of Patent: Oct. 20, 2015

(54) DEVICE FOR LOCATING A VEHICLE AND METHOD OF GENERATING VEHICLE LOCATION INFORMATION

(75) Inventor: Serge Hernando, Cergy (FR)

(73) Assignee: Johnson Controls Automotive Electronics SAS, Cergy-Pontoise Cedex (FR)

( * ) Notice: Subject to any disclaimer, the term of this patent is extended or adjusted under 35 U.S.C. 154(b) by 124 days.

(21) Appl. No.: 13/879,317

(22) PCT Filed: Oct. 13, 2011

(86) PCT No.: PCT/EP2011/005135
§ 371 (c)(1),
(2), (4) Date: Jun. 24, 2013

(87) PCT Pub. No.: WO2012/048876
PCT Pub. Date: Apr. 19, 2012

(65) Prior Publication Data
US 2013/0282274 A1    Oct. 24, 2013

(30) Foreign Application Priority Data

Oct. 13, 2010    (DE) .......................... 10 2010 048 378

(51) Int. Cl.
*G01C 21/12* (2006.01)
*G01C 21/00* (2006.01)
(Continued)

(52) U.S. Cl.
CPC ............... *G01C 21/00* (2013.01); *G01C 21/12* (2013.01); *G01C 21/28* (2013.01); *G01C 22/025* (2013.01); *G05D 1/0272* (2013.01)

(58) Field of Classification Search
CPC ...... G01C 21/28; G01C 22/025; G01C 21/12; G01C 21/00; G05D 1/0272

USPC .......................... 701/472, 518; 340/988, 992
See application file for complete search history.

(56) References Cited

U.S. PATENT DOCUMENTS

| 5,416,712 A | 5/1995 | Geier et al. |
| 2003/0163255 A1 | 8/2003 | Ishigami et al. |

(Continued)

FOREIGN PATENT DOCUMENTS

| DE | 197 17 829 A1 | 11/1998 |
| DE | 199 45 694 A1 | 4/2000 |

(Continued)

OTHER PUBLICATIONS

International Preliminary Report on Patentability mailed Apr. 25, 2013, as received in corresponding International Patent Application No. PCT/EP2011/005135.

(Continued)

*Primary Examiner* — Thomas G Black
*Assistant Examiner* — Sze-Hon Kong
(74) *Attorney, Agent, or Firm* — Foley & Lardner LLP

(57) ABSTRACT

A device for locating a vehicle and a method of generating location information are provided. The location device includes or is associated with a satellite-positioning location interface and a dead-reckoning location module. The satellite-positioning location interface and the dead-reckoning location module allow the location device to generate vehicle location information. The vehicle location information is generated by the dead-reckoning location module when the vehicle is detected as being in an area of poor satellite signal reception. A calibration of the dead-reckoning location module is provided when the vehicle is detected as being in an extended area with good satellite signal reception.

10 Claims, 7 Drawing Sheets

Figure 1:
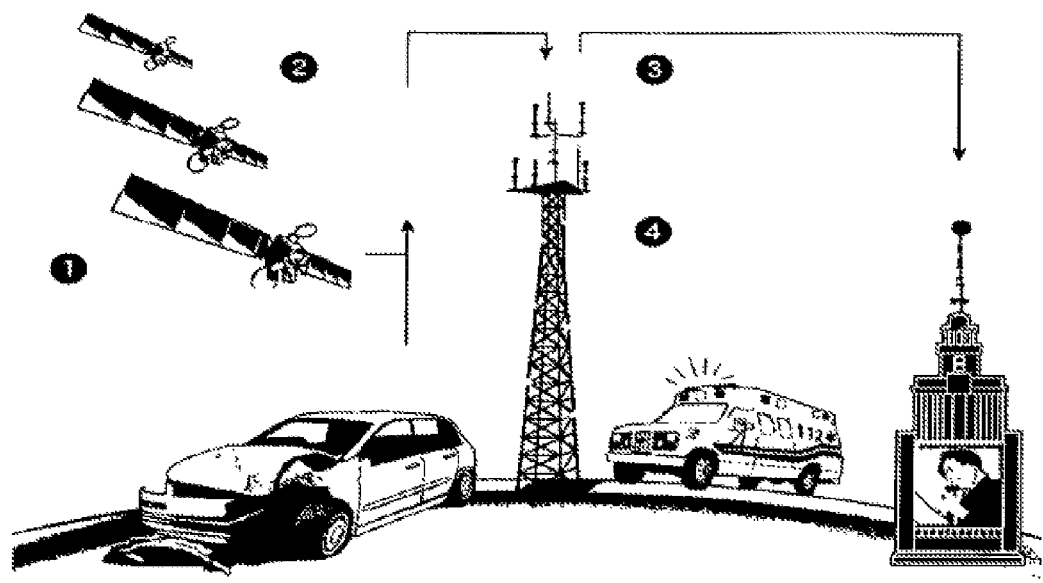

(51) Int. Cl.
  *G01C 22/02* (2006.01)
  *G05D 1/02* (2006.01)
  *G01C 21/28* (2006.01)

(56) References Cited

U.S. PATENT DOCUMENTS

2008/0119978 A1* 5/2008 Stieff et al. ................. 701/29
2010/0141736 A1* 6/2010 Hack ........................... 348/36

FOREIGN PATENT DOCUMENTS

DE  10 2005 002 719 A1  8/2006
WO  WO 99 04280 A1  1/1999

OTHER PUBLICATIONS

English translation of the International Search Report received in connection with international application No. PCT/EP2011/005135; dtd Feb. 1, 2012.

* cited by examiner

DEVICE FOR LOCATING A VEHICLE AND METHOD OF GENERATING VEHICLE LOCATION INFORMATION

CROSS REFERENCE TO RELATED APPLICATIONS

The present application is a National Stage of International Application No. PCT/EP2011/005135 filed on Oct. 13, 2013, which claims the benefit of German Patent Application No. 10 2010 048 378.8 filed on Oct. 13, 2010, the entire disclosures of which are incorporated herein by reference.

The present invention relates generally to a locator device for locating a vehicle, for example for a motor car, and a method for generating location data of such a vehicle with the aid of a locator device.

Numerous motor vehicles equipped with integrated satellite positioning navigation systems, using GPS (Global Positioning System) or SPS receivers, are known in the prior art, cooperating with dead-reckoning navigation sensors, also integrated in the vehicle, supplying odometry data, of gyroscopic heading, wheel speed, acceleration, orientation, etc. Nevertheless, such integrated navigation systems even today exhibit a significant surcharge during the purchase of a new vehicle. Also known in the prior art, in particular from documents DE 197 17 829 A1 and DE 199 45 694 A1, is a method for generating location data of a vehicle, and in particular from document DE 10 2005 002 719 A1, a heading prediction method.

An aim of the present invention is to address the various drawbacks of prior art mentioned above and in particular to provide a vehicle with a locator device and implementing a method for generating location data which is capable of generating location data that is reliable and precise, and with minimal effort required and minimal surcharge incurred.

To this end, a first aspect of the invention relates to a locator device for locating a vehicle, the locator device comprising or being associated with a satellite positioning location interface, the locator device comprising or being associated with a dead-reckoning location module, the satellite positioning location interface and the dead-reckoning location module enabling the locator device to generate location data of the vehicle, the location data of the vehicle being generated via the dead-reckoning location module when the vehicle is detected to be in an area of poor satellite signal reception conditions, and the dead-reckoning location module being calibrated when the vehicle is detected to be in an extensive area of good satellite signal reception conditions.

Integrating such a locator device in a vehicle advantageously provides for reliably generating location data of the vehicle with standard sensors of the dead-reckoning module.

According to one advantageous embodiment, the locator device comprises or is associated with a mobile communication interface for transmitting location data of the vehicle to an emergency call center.

The presence of such a mobile communication interface provides for implementing an "emergency call" feature, for example eCall or eCALL. eCALL is a European Commission initiative aiming to introduce a pan-European automatic emergency call system based on a public service, enabling a vehicle involved in an accident to immediately call the emergency services while sending its precise position (or vehicle location), whether or not the occupants of the vehicle are conscious, and in any country of the European Union in which the vehicle is located. In particular, the system can be based on the single European emergency number (number 112) and allows the emergency services to intervene faster, and in a manner suited to the severity of the accident and to the type of vehicles involved, thus reducing mortality and the severity of the injuries arising from road traffic accidents. The mobile communication interface comprises in particular a SIM (Subscriber Identity Module) card and makes a call to the emergency call center using in particular the number 112. Other services exist outside Europe, for example the 911 call in the USA and in Canada.

When a vehicle witnesses an accident without being involved in it, the emergency call can be activated manually according to an advantageous variant of the present invention. Furthermore, it may be preferred that a voice call then be established between the emergency call center operator and the vehicle, in order that the passengers may convey details of the scenario if they are capable of doing so. At the same time, the emergency call center operator receives a minimum set of data which includes in particular the location of the vehicle, i.e. the vehicle position. This location data comes directly from the locator device.

According to a preferred embodiment of the present invention, the dead-reckoning location module is calibrated through the application of a Kalman filter.

This enables the locator device to generate the location data more reliably and to reduce location or positioning error when satellite signals are unavailable for a satellite positioning. Generally, since the sensors associated with the vehicle and used to carry out dead-reckoning location produce measurement signals or values containing errors, locating the vehicle based purely on dead-reckoning locating or positioning accumulates increasingly significant errors when the period of absence of satellite signal reception or the distance traveled by the vehicle without signals received from the satellite is long. By using a multitude of different sensors associated with the vehicle, it is possible to reduce the location error such that the location data can be generated reliably, in particular by using a Kalman filter.

According to another preferred embodiment of the present invention, the locator device provides for a fusion of data from the dead-reckoning location module and from the satellite positioning location interface.

By virtue of such an implementation of the locator device, it is advantageously possible according to the present invention to improve the precision of the location data generated with the aid of the locator device. In particular by means, the fusion of data from odometry sensors (i.e. sensors associated with the dead-reckoning location module) with data obtained via the satellite positioning location interface, it is possible to obtain vehicle position data that is very precise and robust with regard to influences of the environment. By virtue of the redundant determination of the vehicle position data, this data can be determined even if one of the detection units (for example the satellite positioning location interface) is temporally incapable of obtaining data following a situation of poor satellite signal reception conditions. Thus, it is, for example, possible with the present invention to determine the position of the vehicle inside multi-storey car parks or inside tunnels (when satellite signal reception is generally disrupted) via the dead-reckoning location module (i.e. using odometry data). Thus, the method according to the present invention is protected from disruptions from the environment of the vehicle and provides for a permanent tracking of the vehicle.

According to another preferred variant of the present invention, the mobile communication interface is provided to transmit location data automatically over a predetermined time interval or to receive query data with a view to transmitting location data.

By virtue of such an implementation of the present invention, it is advantageously possible to implement a Stolen Vehicle Tracking (SVT) service. Since the vehicle position is known in the locator device of the vehicle, this location data can be saved, even remotely, when a query signal or query data is transmitted to the vehicle while the mobile communication interface is capable of receiving this query data (or this query signal) in order to then transmit the vehicle location data. In an alternative embodiment of the present invention, provision can be made for the location data to be automatically transmitted after a predetermined time interval, i.e. every 24 or 36 hours (at least when a movement of the vehicle has been detected during this period) a signal is transmitted by the mobile communication interface in order to transmit the vehicle location data. Equally, provision can be made for the vehicle location data to be transmitted automatically when the vehicle has stopped and then at least every 24 or 36 hours when the vehicle is not traveling.

Another aspect of the present invention relates to a method for generating location data of a vehicle with the aid of a locator device, the locator device comprising or being associated with a satellite positioning location interface, the locator device comprising or being associated with a dead-reckoning location module, the satellite positioning location interface and the dead-reckoning location module enabling the locator device to generate location data of the vehicle, the location data of the vehicle being generated via the dead-reckoning location module when the vehicle is detected to be in an area of poor satellite signal reception conditions, and the dead-reckoning location module being calibrated when the vehicle is detected to be in an extensive area of good satellite signal reception conditions.

By virtue of such an implementation of the present invention, it is advantageously possible for the determination of the location of a vehicle (or the position of a vehicle) to be carried out with a reduced location or positioning error owing to the almost continuous calibration step which provides for using the sensors of the dead-reckoning location module to obtain the vehicle position with a small deviation from its actual position.

According to a preferred variant of the present invention, the locator device comprises or is associated with a mobile communication interface, and, dependent on a command signal, the location data of the vehicle is transmitted to an emergency call center.

According to another preferred variant of the present invention, the location data of the vehicle is transmitted automatically over a predetermined time interval or dependent on the reception of query data received by the mobile communication interface.

Figure 2:
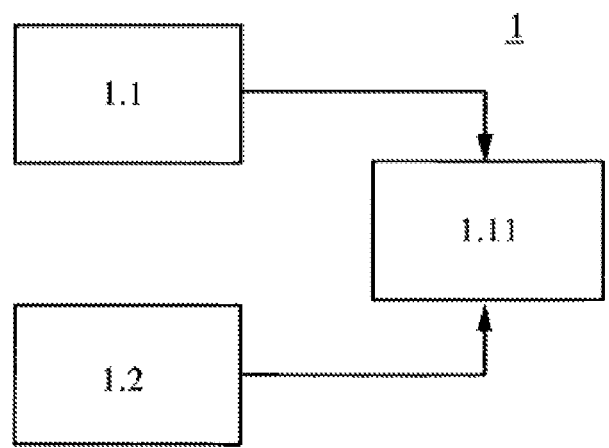
Figure 3:
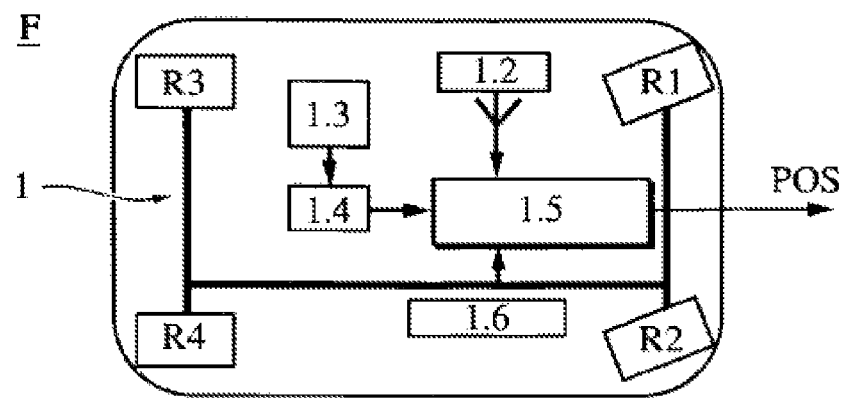
Figure 4:
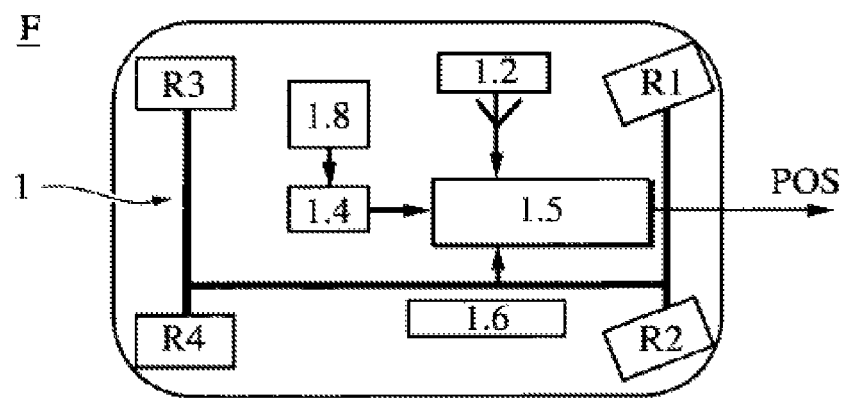
Figure 5:
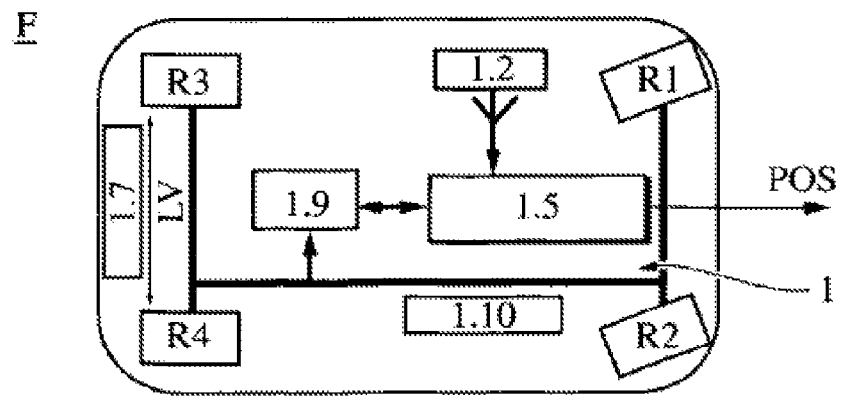
Figure 6:
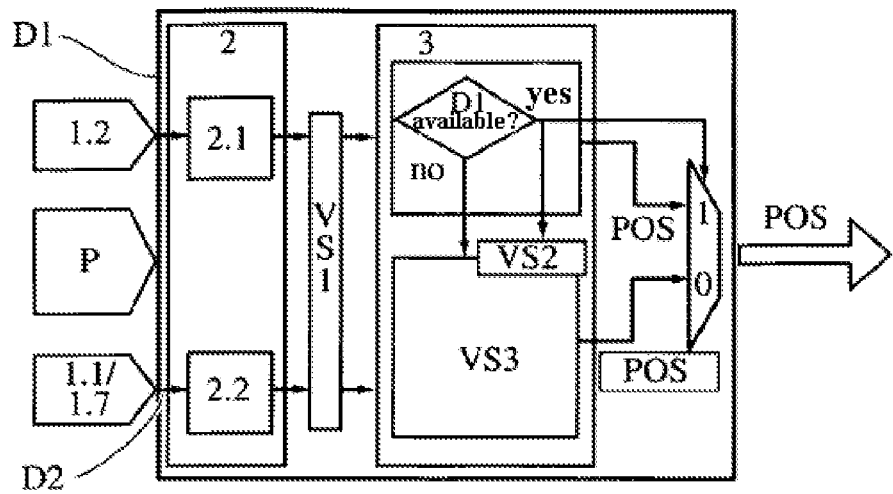
Figure 7:
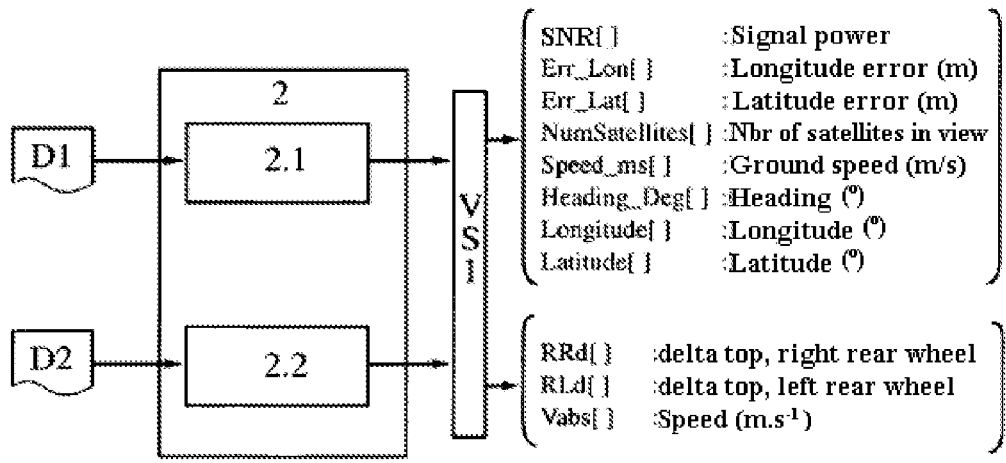
Figure 8:
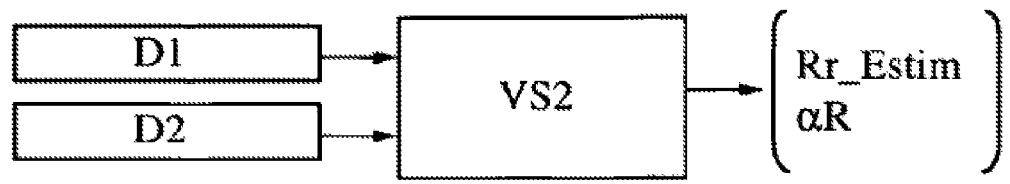
Figure 9:
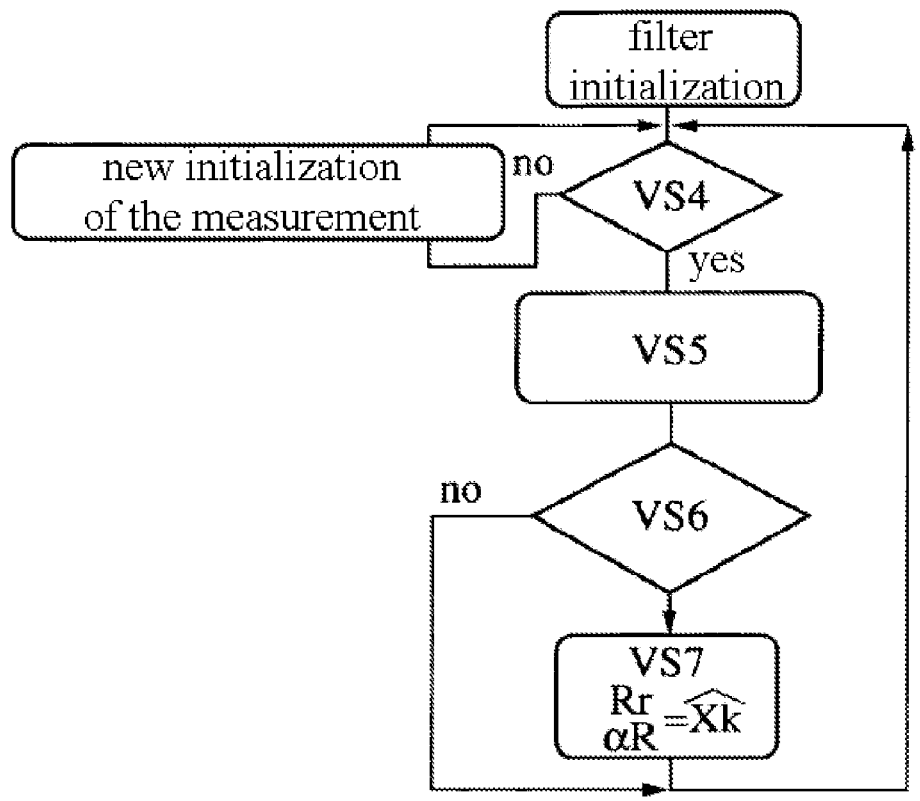
Figure 10:
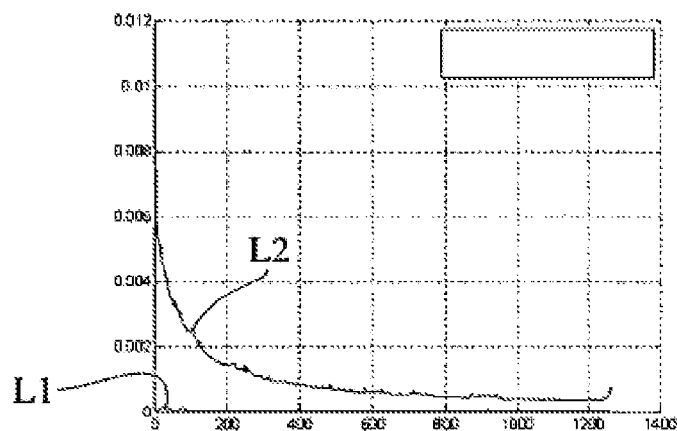
Figure 11:
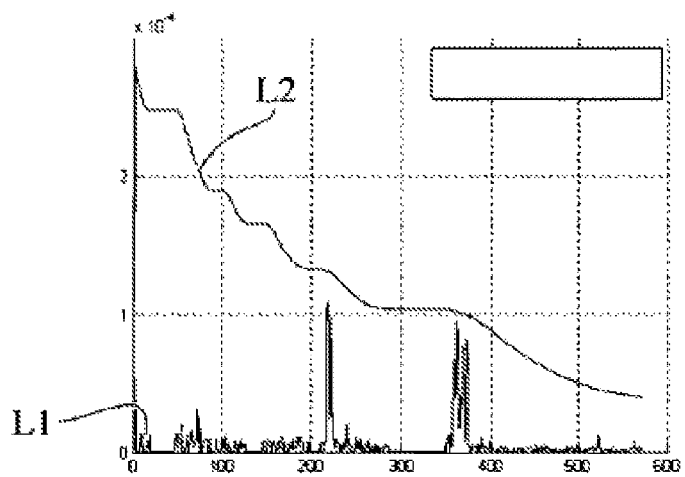
Figure 11:
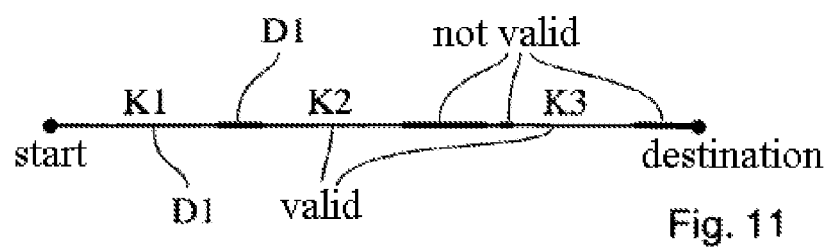
Figure 12:
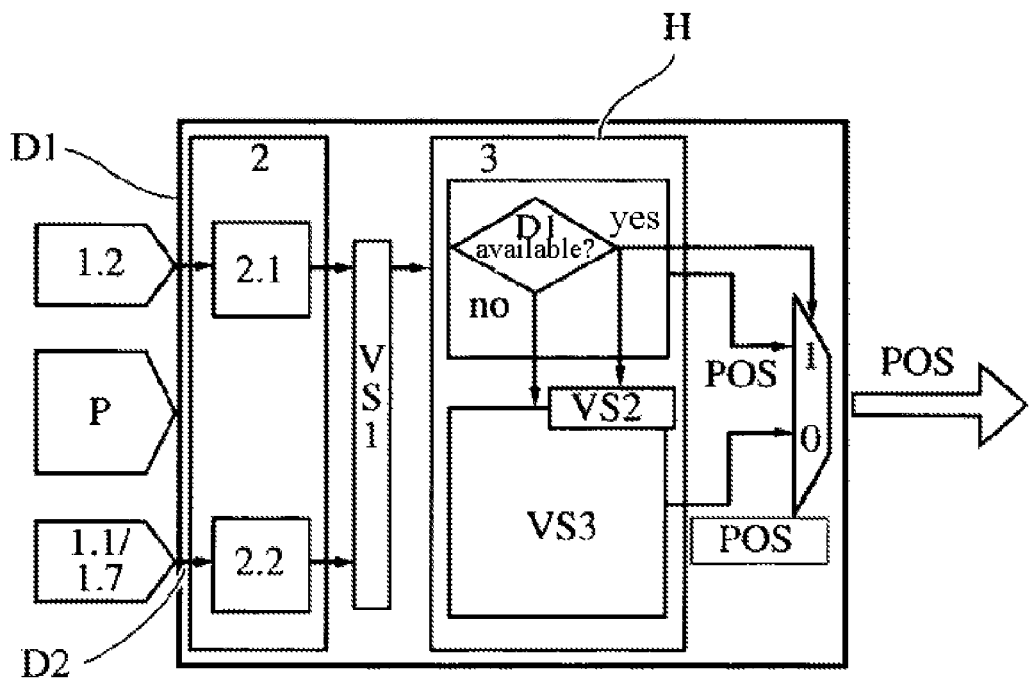
Figure 13:
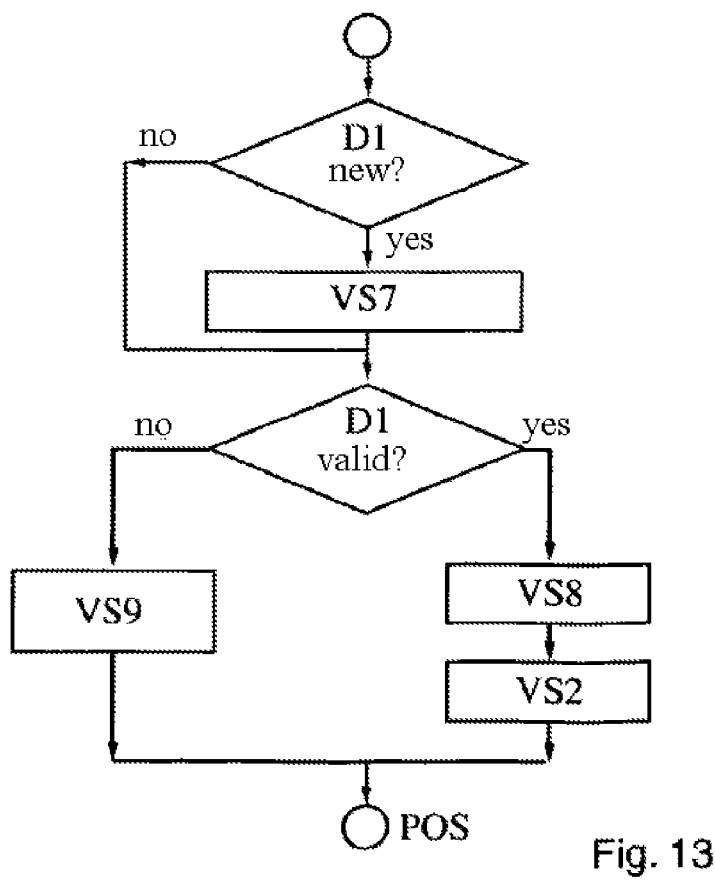
Figure 14:
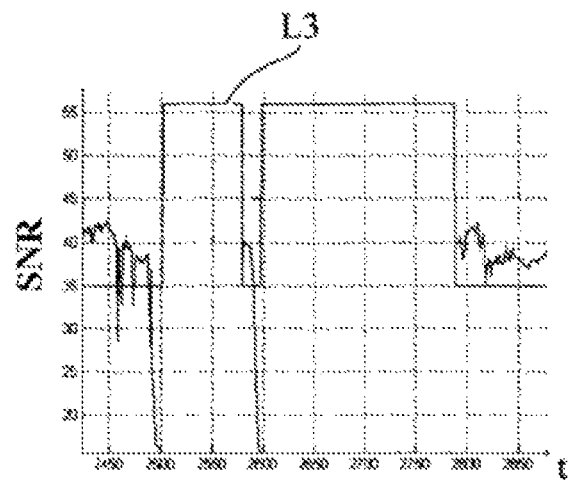
Figure 15:
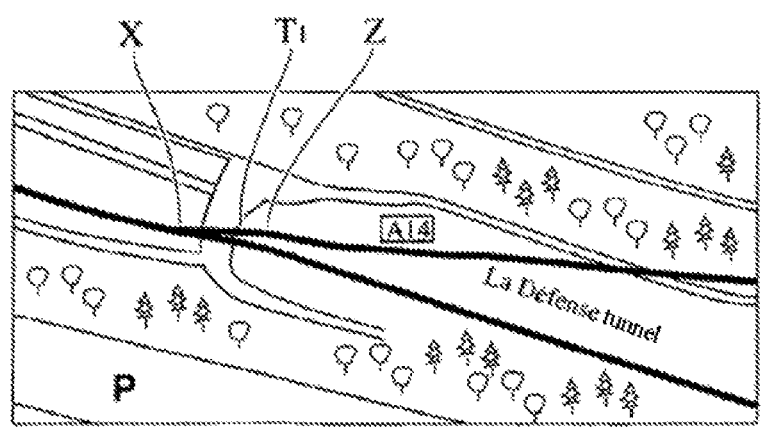

Other features and advantages of the present invention will become clearer upon reading the following detailed description of embodiments of the invention which are given by way of examples which are not at all limiting and which are illustrated by the accompanying drawings in which:

FIG. 1 schematically represents the progress of an alarm following a vehicle accident, the vehicle being equipped with a mobile communication interface, in particular an eCall system, FIG. 2 schematically represents a block diagram of a locator device according to the present invention, FIG. 3 schematically represents a vehicle with a locator device, the locator device corresponding to a first embodiment according to the present invention, FIG. 4 schematically represents a vehicle with a locator device, the locator device corresponding to a second embodiment according to the present invention, FIG. 5 schematically represents a vehicle with a locator device, the locator device corresponding to a third embodiment according to the present invention, FIG. 6 schematically represents a flow chart corresponding to a method for generating vehicle location data, according to the present invention, FIG. 7 schematically represents a diagram of the acquisition and formatting of data obtained by the satellite positioning location interface and/or from the dead-reckoning location module (GPS data and/or odometry data, in particular ABS (Antilock Braking System) data), FIG. 8 schematically represents a flow chart for the calibration of data obtained by the satellite positioning location interface and/or from the dead-reckoning location module (GPS data and/or odometry data, in particular ABS (Antilock Braking System) data), FIG. 9 schematically represents a flow chart for the processing of data by a Kalman filter method, in particular for the example of rear wheel data (in particular the diameter or radius of the rear wheels of the vehicle), FIGS. 10 and 11 schematically represent the evolution of the results of a filtering dependent on iterations, FIG. 12 schematically represents a flow chart for vehicle location data generation, FIG. 13 schematically represents a flow chart for the generation of vehicle location data obtained by the satellite positioning location interface and/or from the dead-reckoning location module (GPS data and/or odometry data), FIG. 14 schematically represents the change with time of the signal-to-noise ratio for signals obtained by the satellite positioning location interface, and FIG. 15 schematically represents a visualization of an example application of the locator device (with the aid of a drawing of a road) according to the present invention.

In the accompanying drawings, matching parts on different figures bear identical references.

In FIG. 1, the alarm procedure following a vehicle accident is represented schematically. The vehicle is equipped with a mobile communication interface, in particular an eCall system.

In a first step, an alarm signal is transmitted following a vehicle accident. The communication interface notably forms part of a mobile communication network. The accident is notably detected via sensors (in particular sensors (not represented), notably acceleration sensors, for example used for triggering airbags inside the vehicle). The alarm signal can alternatively be triggered via manual interaction by the user of the vehicle, in particular when there is a medical emergency situation.

In a second step, data on the vehicle position is detected by a navigation system in the vehicle, in particular a locator device, the navigation system having notably a satellite positioning location interface. Hereafter, the satellite positioning location interface is also referred to as satellite sensor or GPS sensor. In order to obtain a correct location (i.e. a more precise location) of the vehicle, the vehicle position data is determined continuously by a dead-reckoning vehicle location method. To this end, the present invention provides for data or signals from various sensors to be merged in order to obtain the position of the vehicle. The GPS sensor forms part of these sensors. The determined position of the vehicle is then transmitted to a nearby emergency call center. Other information can also be transmitted, in particular the nature of the accident, whether the accident is serious, etc.

In a third step, the emergency call center tries to make contact with the passengers of the vehicle. At the same time, the emergency services are called in a fourth step, the vehicle position data being transmitted to the emergency services.

The more precisely the vehicle position is known, the better the rescue operation can be performed. To this end, it is advantageous to know the vehicle position continuously, and without being influenced by the environment of the vehicle. Furthermore, it is vital to know the vehicle position with a high degree of position. This can be achieved using a locator device and a method according to the present invention.

In FIG. 2, a block diagram of a locator device 1 according to the present invention is represented schematically. The locator device 1 comprises (or is associated with) a satellite positioning location interface 1.2 (also referred to as GPS sensor or satellite sensor).

Furthermore, the locator device 1 comprises (or is associated with) a dead-reckoning location module 1.1. Thus, data from at least two sensors is merged to obtain (or to generate) the location data of the vehicle. In the example shown, this is data from an odometry sensor (integrated in the dead-reckoning location module 1.1) and from a GPS sensor (integrated in the satellite positioning location interface 1.2). Using the odometry sensor 1.1, the position (or location data) of the vehicle can be obtained reliably based on odometry data. Using the satellite positioning location interface 1.2, the position (or location data) of the vehicle can be obtained reliably based on satellite signals. When satellite data reception is interrupted (in particular when the vehicle is in a tunnel), vehicle location data cannot be determined. By virtue of the fusion of data from the dead-reckoning location module 1.1 (in particular the odometry sensors) and data from the satellite positioning location interface 1.2, precise determination of the vehicle position is nevertheless possible according to the present invention, even in the absence of satellite signal reception. Due to the high precision in the determination of the vehicle location data according to the present invention, the vehicle position can be obtained with high precision but with reduced hardware costs. Due to the use of a plurality of different data sources (redundant) to obtain the vehicle position, it is possible to reduce the impact of the errors of the sensors used, in particular odometry sensor errors (in the dead-reckoning location module 1.1).

In FIG. 3, a vehicle F with a locator device 1 is represented schematically. The locator device 1 represented in FIG. 3 corresponds to a first embodiment according to the present invention.

According to the first embodiment, the locator device 1 comprises a gyroscope 1.3, through which variations in the heading of the vehicle F can be detected when the vehicle F is moving. The data obtained by the gyroscope 1.3 is transmitted to an analog-to-digital converter 1.4. The analog-to-digital converter 1.4 converts the analog data into digital signals for subsequent processing. The digital signals are later communicated to a processing module 1.5, in particular a microprocessor. Furthermore, signals from an odometer 1.6 are also communicated to the processing module 1.5. These signals correspond, for example, to signals from the wheels R1 to R4 of the vehicle F. These signals from the wheels R1 to R4 of the vehicle F are, for example, from an antilock braking system 1.7 of the vehicle F, the antilock braking system being represented in FIG. 5. Furthermore, the signals from the satellite positioning location interface 1.2 (in particular from the satellite sensor or GPS sensor) are also communicated to the processing module 1.5.

By virtue of the processing module 1.5, a fusion of the data from the various sensors is possible, and the vehicle location data can be determined.

The first embodiment according to FIG. 3 of the locator device 1 performs very well, and it is in particular independent of a data bus, for example a CAN (Controller Area Network) type data bus. Thus, the solution according to the first embodiment of the locator device 1 is suitable for being retrofitted into the vehicle F.

In FIG. 4, the vehicle F with the locator device 1 is represented schematically. The locator device 1 represented in FIG. 4 corresponds to a second embodiment according to the present invention.

According to the second embodiment (and unlike the first embodiment represented in FIG. 3), the locator device 1 does not comprise a gyroscope 1.3, but a rather a compass 1.8 through which variations in the heading of the vehicle F can be detected when the vehicle F is moving. The data obtained by the compass 1.8 is transmitted to the analog-to-digital converter 1.4. The analog-to-digital converter 1.4 converts the analog data into digital signals for subsequent processing. The digital signals are later communicated to the processing module 1.5, in particular a microprocessor. Furthermore, signals from an odometer 1.6 are also communicated to the processing module 1.5. These signals correspond, for example, to signals from the wheels R1 to R4 of the vehicle F. These signals from the wheels R1 to R4 of the vehicle F are, for example, from an antilock braking system 1.7 of the vehicle F, the antilock braking system being represented in FIG. 5. Furthermore, the signals from the satellite positioning location interface 1.2 (in particular from the satellite sensor or GPS sensor) are also communicated to the processing module 1.5.

By virtue of the processing module 1.5, a fusion of the data from the various sensors is possible, and the vehicle location data can be determined.

The second embodiment according to FIG. 4 of the locator device 1 also performs very well, and it is in particular independent of a data bus, for example a CAN (Controller Area Network) type data bus. Thus, the solution according to the second embodiment of the locator device 1 is suitable for being retrofitted into the vehicle F.

In FIG. 5, the vehicle F with the locator device 1 is represented schematically. The locator device 1 represented in FIG. 5 corresponds to a third embodiment according to the present invention.

According to the third embodiment of the locator device, the signals from the satellite positioning location interface 1.2 (in particular from the satellite sensor or GPS sensor) are communicated to the processing module 1.5. The processing module 1.5 is also connected to a control module 1.9 or with a control unit for a data bus system 1.10, in particular a CAN (Controller Area Network) type data bus of the vehicle F. Data on the speed of the rear wheels R3, R4, respectively, is communicated to the processing module 1.5. This data is notably generated via the anti-lock braking system 1.7 of the vehicle F, in particular via a rotation speed sensor (not represented) for the rear wheels R3, R4 of the vehicle F (which form part of the odometry sensor, i.e. of the dead-reckoning location module 1.1 of the vehicle F).

With the aid of the processing module 1.5 and from the rotation speeds (or angular speeds $\omega_l$, $\omega_r$) of the rear wheels R3, R4, the radii $R_l$, $R_r$ of the rear wheels, and the distance $L_v$ of the rear wheels R3, R4, one with respect to the other, a variation in the heading H of the vehicle F is computed according to the formula:

$$\dot{H} = \begin{bmatrix} \omega_l \times R_l - \omega_r \times R_r \\ L_V \end{bmatrix} \quad [1]$$

as well as a distance traveled.

The third embodiment according to FIG. 5 of the locator device 1 notably has the advantage that additional sensors are not necessary, thereby reducing costs. For this reason, the third embodiment notably lends itself to original equipment of vehicles F, in particular during production of the vehicle F. Thus, a solution tailored to the type of vehicle in question is possible in a simple and effective manner.

In FIG. 6, a flow chart corresponding to a method for generating location data of a vehicle F according to the present invention is represented schematically.

Data D1 from the GPS sensor (i.e. from the satellite positioning location interface 1.2) is communicated to an NMEA pilot 2.1 of a data processing unit 2. (The abbreviation "NMEA" refers to standards for communication between marine equipment, including GPS equipment, which standards are defined and controlled by the National Marine Electronics Association (NMEA), a US association of maritime electronic equipment manufacturers). Furthermore, odometry data D2 (in particular data from the anti-lock braking system 1.7, for example of the wheels R1 to R4), from the dead-reckoning location module 1.1, in particular an odometry sensor, is transmitted to the data processing unit 2 (and processed by a conversion unit 2.2). Furthermore, parameters P of the system and of the vehicle F are supplied to the data processing unit 2.

During a first processing step VS1, data synchronization is performed, before the data is supplied to a navigation component 3. In the navigation component, a check as to whether the GPS data D1 is present is carried out.

If the GPS data is available, the location data, i.e. the position of the vehicle F, is computed (in a second processing step VS2) from the GPS data D1 (by virtue of the satellite position location interface 1.2), and the GPS sensor and the GPS data D1 are calibrated.

When the GPS data D1 is not available, the location data i.e. the position of the vehicle F, is computed (in a third processing step VS3) from the odometry data D2 and from the last available GPS data D1.

In FIG. 7, a diagram of the acquisition and formatting of data obtained by the satellite positioning location interface 1.2 (data D1) and/or from the dead-reckoning location module 1.1 (GPS data and/or odometry data, in particular ABS (anti-lock braking system) data) (data D2) is represented schematically.

The GPS data D1 and the odometry data D2 are supplied to the data processing unit 2 in the form of .txt files, i.e. in a text format. Preferably, the format of the GPS data D1 and of the odometry data D2 is given in the form represented in FIG. 7.

The calibration step mentioned in FIG. 6 (during the processing step VS2) is preferably carried out using a Kalman filter (not represented) according to FIG. 8. FIG. 8 schematically represents a flow chart for the calibration of data obtained by the satellite positioning location interface 1.2 and/or from the dead-reckoning location module 1.1 (GPS data and/or odometry data, in particular ABS (Antilock Braking System) data)).

The aim of this calibration step is an estimate of the state of the vehicle F as a function of the radius of the rear wheels R3, R4 and a difference in the radius of these two wheels R3, R4.

At this level, the two complementary data sources (i.e. the satellite positioning location interface 1.2 (GPS data D1) and the dead-reckoning location module 1.1 (odometry data D2)) exist and have different update frequencies: the satellite positioning location interface 1.2 with a low frequency (for example about 1 Hz), and the dead-reckoning location module 1.1 with a higher frequency (for example about 50 Hz).

To perform a linear coupling of the GPS data D1 and odometry data D2, an exact calibration of the odometry sensor (i.e. of the dead-reckoning location module 1.1) and of the GPS sensor (i.e. of the satellite positioning location interface 1.2) is necessary.

When the GPS data D1 is being calibrated, an estimated radius Rr_Estim of the rear wheels R3, R4 is determined. When the odometry data D2 is being calibrated, a difference R between the radii of the two rear wheels R3, R4 is determined.

During the calibration, it is assumed that an average value of parasitic noise is equal to zero. Furthermore, the average value of the measurement noise must be zero. Another premise is assuming that there is no correlation between the parasitic noise and the measurement noise; in other words: the measurement noise is independent of the parasitic noise.

These premises are verified during calibration in such a way that it is assumed, following a complicated modeling of the effect of the environment, that the average value of the parasitic noise is zero. A covariance of a measurement error is due to the GPS sensor (i.e. the satellite positioning location interface 1.2) such that, consequently, the average value of the measurement noise is zero. Furthermore, the GPS data D1 (from the satellite positioning location interface 1.2) and the odometry data D2 (from the dead-reckoning location module 1.1), associated with the process and with the measurement, are obtained with different sensors (i.e. with the satellite positioning location interface 1.2 and with the dead-reckoning location module 1.1), such that there is no correlation between the parasitic noise and measurement noise.

During calibration by employing the Kalman filter, the following system of equations is used:

$$x_{k+1} = A \cdot x_k + w_k \quad [2]$$

and the following analysis system:

$$y_k = C \cdot x_k + z_k \quad [3]$$

The vector of the process at the moment k is given by:

$$x_k = \begin{vmatrix} Rr \\ dr \end{vmatrix} \quad [4]$$

and the vector of the measurement at the moment k is given by:

$$y_k = \begin{vmatrix} Dr \\ dHeading \end{vmatrix} \quad [5]$$

$w_k$ being the parasitic noise and $z_k$ the measurement noise.

The vector of the process is given by:

$$Rr_{k+1} = Rr_k \quad [6]$$

and $$Rl_k = Rr_k + dR_k \quad [7]$$

and $$Dr_{k+1} = dR_k \quad [8]$$

to arrive at:

$$A = \begin{pmatrix} 1 & 0 \\ 0 & 1 \end{pmatrix}. \quad [9]$$

To determine the measurement vector, a distance traveled by the righthand rear wheel R4 and the variation in the heading is determined, and the measurement vector is given by:

$$Y = \begin{vmatrix} Dr \\ dHeading \end{vmatrix} \quad [10]$$

The linear relationship between the process vector and the measurement vector is given by the following equation:

$$C = \begin{pmatrix} \dfrac{dtop_r + 2\pi}{48} & 0 \\ \dfrac{(dtop_l - dtop_r) + 2\pi}{48 \cdot d_y} & \dfrac{dtop_l + 2\pi}{48 \cdot d_y} \end{pmatrix}. \quad [11]$$

The radii of the rear wheels R3 and R4 can be determined, for example, and with a tolerance of 1 mm:

$$Rr = 0.3396 \pm 10^{-3} \text{ [m]} \quad [12]$$

and $$dR = 0.0 \pm 10^{-3} \text{ [m]} \quad [13]$$

such that it follows that:

$$Q = \begin{pmatrix} 10^{-6} & 0 \\ 0 & 10^{-6} \end{pmatrix} \quad [14]$$

The measurement error of the GPS sensor (i.e. the satellite positioning location interface 1.2) at a distance of 5 meters is given as follows:

$$\sigma measurement = \sqrt{\sigma^2 \text{longitude} + \sigma^2 \text{latitude}} \quad [15]$$

Thus, it follows that:

$$R = \begin{pmatrix} \sigma^{-6}_{measurement} & 0 \\ 0 & \sigma^{-6}_{heading} \end{pmatrix} \quad [16]$$

with the value of the error of the GPS heading constant:

$$\sigma_{heading} = 10^{-3} \quad [17]$$

FIG. 9 schematically represents a flow chart for the processing of data by a Kalman filter method, in particular for the example of rear wheel data (in particular the diameter or radius of the rear wheels of the vehicle).

To initialize the filter, a fourth processing step VS4 provides for a check as to whether valid signals exist. When the two signals do not exist, a new initialization of the measurement is carried out. When the two signals exist, a fifth processing step VS5 provides for the determination of the variation in the heading and in the distance traveled by the rear wheels R3, R4.

A sixth processing step VS6 provides for the determination of whether the distance traveled and the variation in the heading are greater than predetermined limit values, respectively. When these two conditions are met, the radii of the rear wheels R3, R4 and the difference between the radii, one with respect to other, are estimated in another processing step. When the conditions are not verified, a new initialization is carried out.

The filtering is valid when two measurements exist which are valid and which follow one another. The filtering is performed for the determination of the heading with a very high degree of precision and with a minimal calibration speed. Furthermore, the filtering is carried out to minimize the relative error and with a minimal calibration distance.

The initial value of the radii is, for example, 0.335 m and the initial value of the difference dR of the radii Rr used is zero: dR=0

FIGS. 10 and 11 schematically represent the evolution of the results of a filtering dependent on filter iterations I. For the righthand rear wheel R4, a radius Rr of 0.33945 m has been determined, and for the lefthand rear wheel R3, a radius Rl of 0.33954 m. The evolution L1, determined using the method according to the present invention, corresponds well with the evolution 3σ L2 and converges relatively quickly.

FIG. 12 schematically represents a flow chart according to FIG. 6 for generating location data of the vehicle F. The main part of the algorithm corresponds to the part H for which a code is generated. The main part H is in particular implemented by the navigation component 3.

FIG. 13 schematically represents a flow chart for the generation of location data POS of the vehicle F, which data is obtained by the satellite positioning location interface 1.2 and/or from the dead-reckoning location module 1.1 (GPS data and/or odometry data) as carried out in the navigation component 3.

When new GPS data D1 arrives, it is checked in a seventh processing step VS7. Then, a check is carried out as to whether the data is valid. If this check is positive, the position POS of the vehicle F is determined in an eighth step VS8. Next, calibration of the odometry sensor 1.1 and the GPS sensor 1.2, as well as of the GPS data D1 and the odometry data D2, is carried out during the second step VS2.

If the GPS data D1 is not valid, the position POS of the vehicle F is determined from the odometry data D2 in a ninth step VS9.

FIG. 14 schematically represents the change with time of the signal-to-noise ratio for signals obtained by the satellite positioning location interface 1.2. The evolution L3 shows that a valid signal is present when the signal-to-noise ratio has a value of about 35. For different values of the signal-to-noise ratio, the signal is not valid.

FIG. 15 schematically represents a visualization of an example application of the locator device (with the aid of a drawing of a road) according to the present invention. The drawing includes a tunnel T1. An initial heading is at least determined at the entrance X of the tunnel. The initial heading Z shows the heading without prediction.

According to the present invention, when the position POS of the vehicle F in the tunnel T1 is being determined, the position POS of the vehicle F is determined for the last time with the aid of the satellite positioning location interface 1.2 at the entrance X of the tunnel T1. There is no valid GPS signal present inside the tunnel T1, and consequently the position POS must be determined from odometry data D2 (ABS data). This determination is so precise that the difference between the computed position of the vehicle F and the actual position of the vehicle F at the exit of the tunnel T1 is very small or even nil according to the present invention.

The invention claimed is:

1. A locator device for locating a vehicle, comprising:
a satellite positioning location interface;
a dead-reckoning location module;
a processing circuit coupling the satellite positioning location interface and the dead-reckoning location module;
wherein the dead-reckoning location module receives a first rear wheel speed and a second rear wheel speed from an anti-lock braking system,
wherein the dead-reckoning location module determines a vehicle heading based on the first rear wheel speed, the second rear wheel speed, a first rear wheel radius, a second rear wheel radius, and a distance between the first rear wheel and the second rear wheel,
wherein the processing circuit is configured to cause the location data of the vehicle to be the location data provided by the dead-reckoning location module when poor satellite signal reception is detected;
wherein the dead-reckoning location module is calibrated using a Kalman filter when the vehicle is detected to be in an extensive area of good satellite signal reception conditions, and wherein the Kalman filter estimates at least one of the radii of the first rear wheel and the second rear wheel and a difference in the radii between the first rear wheel and the second rear wheel.

2. The locator device as claimed in claim 1, wherein the locator device comprises a mobile communication interface configured to transmit location data of the vehicle to an emergency call center.

3. The locator device as claimed in claim 2, wherein the mobile communication interface is configured to transmit location data automatically over a predetermined time interval.

4. The locator device as claimed in claim 1, wherein calibrating the dead-reckoning location module includes the application a Kalman filter.

5. The locator device as claimed in claim 1, wherein the processing circuit is configured to determine a vehicle location based on both data from the dead-reckoning location module and data from the satellite positioning location interface.

6. A method for generating location data of a vehicle with the aid of a locator device, the method comprising:
in response to determining, using a processing circuit, that the vehicle is in an area of poor satellite signal reception conditions, generating location data of the vehicle via a dead-reckoning location module, and
in response to determining, using the processing circuit, that the vehicle is in an extensive area of good satellite signal reception conditions, calibrating the dead-reckoning location module by estimating, using a Kalman filter and information from a satellite positioning location interface, at least one of the radii of the first rear wheel and the second rear wheel and a difference in the radii between the first rear wheel and the second rear wheel,
wherein generating the location data of the vehicle via the dead-reckoning location module includes:
measuring a first rear wheel speed and a second rear wheel speed from an anti-lock braking system; and
calculating a vehicle heading based on the first rear wheel speed, the second rear wheel speed, a first rear wheel radius, a second rear wheel radius, and a distance between the first rear wheel and the second rear wheel,
and wherein the processing circuit is coupled to the satellite positioning location interface and the dead-reckoning location module.

7. The location data generation method as claimed in claim 6, further comprising transmitting, using a mobile communication interface coupled to the locator device, the location data of the vehicle in response to receiving a command signal.

8. The location data generation method as claimed in claim 7, wherein the location data of the vehicle is transmitted automatically over a predetermined time interval.

9. The location data generation method as claimed in claim 6, wherein the calibration of the dead-reckoning location module includes applying a Kalman filter.

10. The location data generation method as claimed in claim 6, wherein the method further comprises merging data from the dead-reckoning location module and from the satellite positioning location interface.

* * * * *